United States Patent Office 3,448,049
Patented June 3, 1969

3,448,049
POLYOLEFINIC SUCCINATES
Albert F. Preuss, Willow Grove, Harry J. White, Maple Glen, and David H. Clemens, Willow Grove, Pa., assignors to Rohm and Haas Company, Philadelphia, Pa., a corporation of Delaware
No Drawing. Filed Sept. 22, 1967, Ser. No. 669,709
Int. Cl. C10m *1/32;* C10l *1/22;* C07c *69/40*
U.S. Cl. 252—51.5                 9 Claims

ABSTRACT OF THE DISCLOSURE

The polyolefinic succinates of this invention are particularly useful as dispersants, corrosion inhibitors and anti-wear agents in lubricating oil and fuel compositions. The novel polyolefinic succinates may be represented by the following formula:

(I) 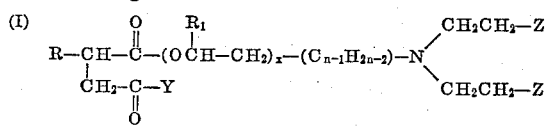

wherein R represents an alkenyl radical containing about 12 to 225 carbon atoms, $R_1$ represents hydrogen or methyl, $x$ represents an integer from 1 to 10, $n$ represents an integer from 1 to 9, Z represents

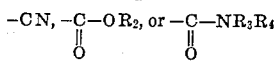

$R_2$ represents an alkyl radical of 1 to 18 carbon atoms, phenyl, benzyl, or an alkylphenyl in which the alkyl moiety contains from 1 to 10 carbon atoms, $R_3$, $R_4$ and $R_5$ independently represent hydrogen, an alkyl radical of 1 to 18 carbon atoms, phenyl, benzyl, or an alkylphenyl in which the alkyl moiety contains from 1 to 10 carbon atoms, and Y represents —$OR_5$, —$NR_3R_4$, and the formula

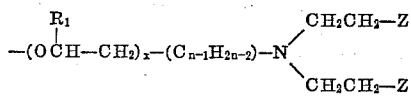

Background of the invention

Internal combustion engines used for vehicles engaged in short run travel (i.e. the so called stop and go driving) do not reach their most efficient operating temperature. Therefore large amounts of undesirable products produced by incomplete combustion of the fuel and oil-insoluble oxidation products from lubricants and other sources accumulate within the internal combustion engine. If these undesirable products deposit on the engine parts, the result is a further reduction of the engine's efficiency. To prevent the accumulation of foreign matter and the disposition of sludge, a dispersant is employed as an additive to the lubricating oil so that the oil-insoluble foreign matter and sludge will remain suspended in the oil and not deposit on any of the vital engine parts.

In addition to the problem of engine deposits, the combustion products of the fuel may cause excessive wear, especially when the engine is operating under relatively cold conditions, which results in an accumulation of moisture and acid products on the engine surfaces. This accumulation promotes wear on various engine parts.

Summary of the invention

It is an object of this invention to prepare novel compounds that may be incorporated into lubricating oils or liquid hydrocarbon fuels for the purpose of dispersing sludge, inhibiting corrosion and acting as anti-wear agents.

The novel compounds of this invention may be represented by Formula I above and may be prepared by reacting an alkenylsuccinic anhydride, alkenylsuccinic acid or an alkenylsuccinamic acid and at least one hydroxy compound represented by the following formula (II) 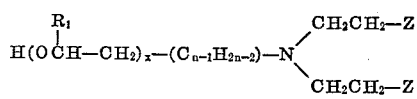

wherein $R_1$, Z, $x$ and $n$ are as previously defined. Alternatively, alkenylsuccinic dihalides or diesters may be used as the acid component in preparing the novel polyolefinic succinates. The compounds of this invention are useful as dispersants in lubricating oil and fuel systems. They may be used in the range of about 0.0005 to 15% by weight of the oil or fuel composition. The compounds of this invention, as evaluated according to several standard tests, exhibit outstanding activity as dispersants.

Detailed description of the invention

The novel compounds of this invention may be represented by Formula I.

R represents an alkenyl radical containing about 12 to 225 carbon atoms. Therefore R will have a molecular weight of about 170 to about 3000, preferably about 600 to about 2500.

Representative $R_2$ groups are methyl, ethyl, propyl, i-propyl, butyl, t-butyl, amyl, octyl, t-octyl, decyl, dodecyl, t-tetradecyl, and octadecyl, phenyl, benzyl, tolyl, butylphenyl, t-butylphenyl, xylyl, octylphenyl, t-octylphenyl and decylphenyl.

Representative $R_3$, $R_4$ and $R_5$ groups include the previously defined $R_2$ groups and hydrogen.

The novel compounds of this invention may be prepared by the reaction of an alkenylsuccinic anhydride or an alkenylsuccinic anhydride derivative with at least one hydroxy-containing compound defined in Formule II.

The compounds of Formula II may be prepared by the reaction of an alkanolamine of the formula (III) 

and an unsaturated ester, amide or nitrile of the formula (IV)        $CH_2=CH_2-Z$ 

wherein $R_1$, $n$ and Z are as previously defined. This reaction is a form of the Michael condensation and procedures for conducting the reaction are well known to those skilled in the art. At least two moles of a Formula IV reactant are used per mole of Formula III reactant. Generally no catalyst is used for the condensation reaction since basicity for the above Michael condensation is supplied by the amine reactant. Optimum yields are obtained by employing a small amount of a conventional polymerization inhibitor that retards polymerization of the unsaturated Formula IV reactant.

A wide range of temperatures may be employed. The reaction is effective at temperatures in the range of 0° C. to about 100° C. or reflux conditions. Generally, temperatures in the range of about 20° C. to about 50° C. are prefered during most of the reaction period. The reaction occurs quite readily at atmospheric pressure, although both sub-atmospheric and super-atmospheric pressures may be used. Although the reaction of the present invention is generally carried out without an inert organic solvent, such a solvent may be employed.

The product resulting from the reaction of a Formula III and a Formula IV compound may be alkoxylated with an alkylene oxide such as ethylene oxide or propylene oxide according to standard techniques.

The following descriptions are illustrative of well known methods for preparing compounds within the scope of Formula II.

EXAMPLE A.—Preparation of diethyl N-(2-hydroxyethyl)iminodipropionate 250 grams (2.5 moles) of ethyl acrylate and 0.25 gram p-methoxyphenol are charged to a reaction flask which is provided with a thermometer, stirrer, dropping funnel and a reflux condenser. While stirring the flask contents with good mixing action, 61.1 grams (1 mole) of ethanolamine is added continuously over a period of about one hour. The reaction temperature is maintained in the range of 35–40° C. by applying appropriate cooling. After an additional ½ hour mixing, the exotherm subsides to indicate that the reaction is essentially complete. The batch is then heated to reflux (temperature of liquid in pot at 110–115° C.), holding there for a period of about 2 hours to ensure complete reaction.

Unreacted ethyl acrylate is stripped-off by gradually reducing the system pressure to 2 mm. Hg (max. pot temperature =115° C.) and holding there for a period of ½ hour to ensure a complete strip. The residue-product, recovered in essentially quantitative yield, is a clear, light yellow liquid. Infrared spectral examination and the appropriate chemical analysis indicated the product was obtained in high purity corresponding to a composition calculated as:

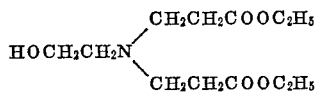

EXAMPLE B.—Preparation of N-(2-hydroxyethyl) iminodiprionamide 142 grams (2.0 moles) of acrylamide and 0.7 gram paramethoxyphenol are dissolved in 200 grams of previously dried ethylene dichloride. The solution is charged to a reaction flask which is fitted with a stirrer, thermometer, reflux condenser and an addition funnel. 61 grams (1 mole) ethanolamine is slowly added, about ½ hour required, to the acrylamideethylene dichloride solution with good mixing action. Cooling is applied to the reaction flask to contain the exothermic reaction maintaining the pot temperature in the range of 35° to 40° C. After the charge is completed, the exotherm persists for a period of about 15–20 minutes at which time the temperature of the batch starts to drop indicating that the reaction is essentially complete. In order to ensure complete reaction, heat is applied to raise the pot temperature to about 85–90° C. and held there for a period of 1.5 hours.

The product is recovered as a stripped residue by gradually reducing the pressure to 2 mm. Hg, holding at a maximum temperature of 100° C. (pot) to ensure removal of solvent and a small amount of unreacted ethanolamine. A clear light-straw colored, viscous product is obtained in about a 95% yield. Infrared spectral examination indicated that the product was essentially free of solvent, unreacted ethanolamine and contained only minor quantities of unreacted acrylamide. Appropriate chemical analysis indicated that the calculated composition of the product corresponded to:

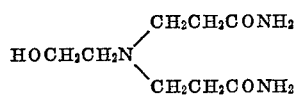

EXAMPLE C.—Preparation of N-(2-hydroxyethyl) iminodipropionitrile

The reaction of ethanolamine with acrylonitrile is effected in the same type of apparatus as used for the previously described ethanolamine addition reactions of Examples A and B and following essentially the same procedure. Ethanolamine (61 grams) is slowly added to the acrylonitrile (212 grams), in which 1 gram of hydroquinone has been dissolved, over a period of one hour with good mixing action. The exothermic reaction is controlled by appropriate cooling so that the temperature of the mix does not exceed 35° C. Heat is then applied to effect a gentle reflux for a period of three hours.

Unreacted acrylonitrile is removed by gradual reduction of pressure on the system to 2 mm. Hg, allowing the temperature of the pot contents to rise to about 100° C. To ensure removal of any unreacted ethanolamine, the batch is held under these conditions for about 30 minutes. The residue product, recovered in about 88–90% yield, was a light brown color and slightly viscous. Infrared spectral examination and chemical analysis indicated a product of essentially high purity corresponding to the composition calculated as:

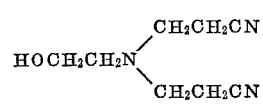

EXAMPLE D

An ethylene oxide adduct of the amide obtained from the reaction of ethanolamine with acrylamide is prepared as follows:

203 grams (1 mole) of N-hydroxyethyliminodipropionamide and 10.8 grams (0.05 mole) of a 25% methanolic solution of sodium methoxide are charged to a pressure type reaction vessel and agitated. Heat is applied and the methanol stripped off by gradually reducing the pressure to 10 mm. Hg after raising the temperature of the mixture to 85° C. ensuring the complete removal of methanol. After flushing the reaction vessel with nitrogen gas, the system is sealed and a charging cylinder, precharged with 180 grams (4.1 moles) of ethylene oxide, is then attached to the charge-port. Sufficient ethylene oxide is charged initially to raise the system pressure to 20–25 p.s.i.g. An exothermic reaction proceeds to raise the temperature of the system then appropriate cooling is applied to maintain the temperature in the range of 100–110° C. Incremental charges of ethylene oxide are appropriately made during a 2 hour period to maintain the pressure in the range of 20–25 p.s.i.g. until all the preweighed ethylene oxide is added. The mixture is stirred an additional one hour period during which time cooling is removed and heat is necessarily applied to maintain the temperature in the 100–110° C. range, meanwhile the system pressure drops to about 5 p.s.i.g. to indicate essentially complete ethylene oxide absorption. The warm vessel contents (ca. 80° C.) are transferred to a glass vessel for the purpose of neutralizing the catalyst by carefully adding the equivalent sulfuric acid as a 20% solution. Water is removed by stripping the neutralized products at reduced pressure, filtering the residue-product on a suction funnel to remove the suspended solids, sodium sulfate, with the aid of 2 grams of Celite 535. The recovered filtrate product, a pale yellow color, weighed 360 grams.

By analysis, the product corresponds to a composition calculated as:

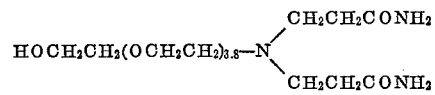

Representative alkanolamines in addition to ethanolamine (2-hydroxyethylamine) include propanolamine (1-aminopropanol-2), 2-amino-2-methylpropanol-1 and 6-aminohexanol-1.

Representative unsaturated esters, amides and nitriles in addition to ethyl acrylate, acrylamide and acrylonitrile include butyl acrylate, octyl acrylate, phenyl acrylate, benzyl acrylate, t-butylphenyl acrylate, N-methylacrylamide, N,N'-dimethylacrylamide, N-n-butylacrylamide, N-t-butylacrylamide, N-phenylacrylamide and N-t-butylphenylacrylamide.

Preferred compounds within the scope of Formula II that may be reacted with an alkenylsuccinic anhydride or derivative thereof include:

(A) N-(2-hydroxyethyl)iminodipropionitrile

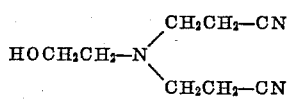

(B) N-(2-hydroxyethyl)iminodipropionamide

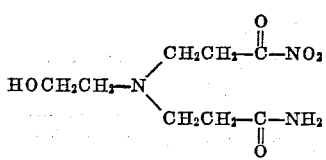

(C) N-(2 - hydroxyethyl)iminodi(N - methylpropionamide)

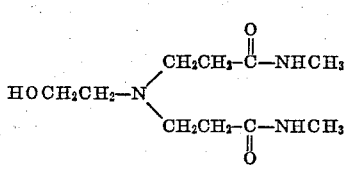

(D) Diethyl N-(2-hydroxyethyl)iminodipropionate

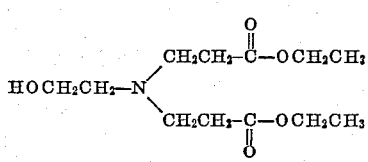

(E) N - (2 - hydroxyethyl)iminodi(N - n - butylpropionamide)

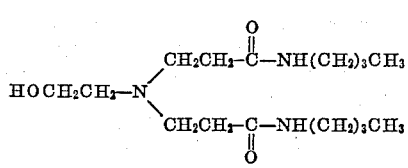

(F) N - (3 - hydroxypropyl)iminodi(N - n - octylpropionamide)

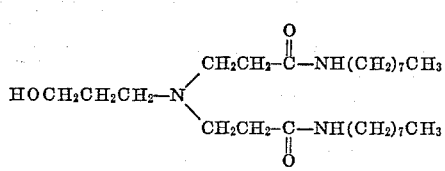

(G) di - n - decyl N - hydroxyethoxyethyliminodipropionate

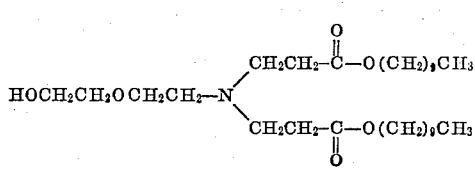

(H) di - t - octylphenyl N - (2 - hydroxypropyl)iminodipropionate

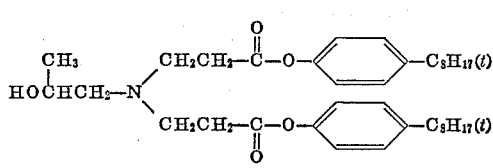

(I) N - (2 - hydroxyethyl)iminodi(N,N' - dimethylpropionamide)

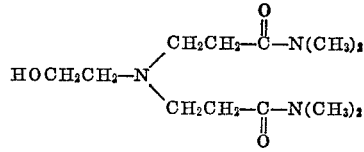

(J) N - (3 - hydroxypropyl)iminodi(N,N' - dibutylpropionamide)

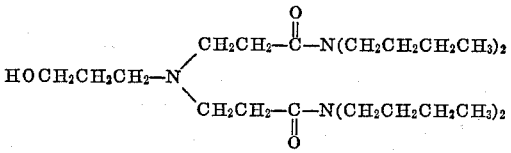

The alkenylsuccinic anhydride reactant is of the formula (V)

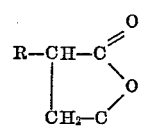

wherein R is as previously defined. This compound is obtained by reacting maleic anhydride with an appropriate polyolefin.

Other alkenylsuccinic type reactants include alkenylsuccinic acid and alkenylsucuinamic acid wherein the alkenyl group corresponds to the definition of R above.

The alkenylsuccinamic acid is prepared by reacting an alkenylsuccinic anhydride with a compound having the formula:

(VI)

wherein A is alkyl of 1 to 24 carbon atoms, phenyl, napthyl, benzyl or alkyl-substituted phenyl, napthyl or benzyl in which the total alkyl substituents contain up to 24 carbon atoms, and B is hydrogen or alkyl of 1 to 24 carbon atoms.

Representative A groups are methyl, ethyl, butyl, t-butyl, octyl, t-octyl, dodecyl, t-octadecyl, tetracosyl, phenyl, napthyl, benzyl, butylphenyl, octylphenyl, dodecylphenyl, dioctylphenyl, butylnaphthyl, butylbenzyl, and octylbenzyl. B may be hydrogen, methyl, butyl, octyl, dodecyl, octadecyl, eicosyl and tetracosyl. Preferably either A or B represents a t-alkyl radical with the remaining substituent being hydrogen. Each of A and B may represent a single alkyl group or a mixture of alkyl groups. For example, either A or B may represent a mixture of t-alkyl groups containing 12 to 15 carbon atoms averaging 13 carbon atoms or a mixture of 18 to 24 carbon atoms. Another preferred embodiment is when either A or B is a t-butyl radical and the remaining substituent is hydrogen. The reaction between the Formula V and Formula VI compounds to produce alkenylsuccinamic acids is conducted at a temperature of about 0° C. to 200° C., and perferably from 60° C. to 120° C.

The R group of Formula V is derived by polymerizing an olefin containing 2 to 18 carbon atoms, preferably 2 to 8 carbon atoms, by addition polymerization from substantially pure olefins. These olefins may be either gaseous or liquid under normal conditions and frequently are obtained from the cracking of petroleum and other hydrocarbons. Fractions containing olefinically unsaturated open-chain hydrocarbons are readily available over a wide range of molecular weights and derived from olefins of 2 to 18 carbon atoms. The preferred olefins are those from 2 to 8 carbon atoms with particular emphasis on the olefin embodiments, containing 4 carbon atoms. It is, of course, preferred to employ relatively pure olefins from which sulfur, cyclic compounds and other impurities have been removed.

Mixtures of various olefins, from ethylene to octadecene, may be used or individual embodiments, as desired. Mixtures of specific olefins, from ethylene to pentene, may be advantageously employed. Particularly advantageous for the present purposes are mixtures of the various butenes. Butenes most commonly used comprise both straight and branched chain members. It is also possible, and frequently desirable, to employ a particular isomer, such as isobutylene, but for the purpose of this invention, separation or isolation of particular isomers is not essential. Thus, the mixtures readily available to the chemical industry are especially useful for the purposes of the present invention. The olefinic polymers employed as starting materials vary from rather fluid liquids to rather viscous liquids at normal temperatures.

Typical olefinic polymers are those prepared from ethylene, propylene, isobutene, 1-butene, 2-butene, 1-pentene, 2-pentene, 1-hexene, 1-octene, 2-octene, 1-decene, 1-dodecene, 2-dodecene and 1-octadecene.

While the group, R, has been structurally presented as attached to a specific carbon atom with respect to Formula V, it will be understood by those skilled in the art that the R group may be positioned on the other carbon atom that is alpha to the other carbonyl group. The R group enters the molecule concerned by a reaction involving maleic anhydride and, therefore, could be attached to either of the carbon atoms alpha to the carboxyl group. This invention encompasses fully this aspect.

The polyolefin is first reacted with maleic anhydride at temperatures of about 200° to 250° C. for a period of about 6 to 16 hours, as desired. The maleic anhydride is used in excess, preferably about 1.5 to 3 times the stoichiometric amount. The use of excess maleic anhydride tends to maximize yields. The polyolefin reacts with maleic anhydride to form a succinic anhydride derivative which can be separated from the excess maleic anhydride by vacuum distillation or similar treatment. The product can be diluted with xylene or similar solvent and filtered.

The polyolefinic succinates of this invention are prepared by reacting an alkenylsuccinic anhydride, an alkenylsuccinic acid, an alkenylsuccinamic acid or another acid derivative such as a halide or ester of alkenylsuccinic acid with at least one hydroxy compound as defined in Formula II at a temperature of about 30° to 250° C., preferably 70° to 150° C., wherein a monoester-acid product is obtained corresponding to Formula I wherein Y would represent —OH. To obtain a diester of a Formula II hydroxy compound, one conducts the reaction at a temperature of about 130° to about 250° C., with the liberation of water, which is preferably removed as it is formed. During the reaction that leads to the monoester-acid previously described, no water is evolved. The time of reaction will be dependent upon the reaction temperature employed. To aid in the control of the reaction temperature and to provide a reaction medium as well as to facilitate the removal of water by azeotropic distillation, the use of hydrocarbon or other solvents such as benzene, toluene, mineral oil, xylene, n-hexane and the like is desirable.

The proportions of alkenylsuccinic acid-producing compound and Formula II reactants may vary from approximately equimolar quantities (1:1 ratio) when the desired product is a monoester of a Formula II hydroxy compound to about 2 or more equivalents of a Formula II compound per mole of alkenylsuccinic acid-producing compound when a diester of a Formula II compound is desired.

To produce a compound corresponding to Formula I wherein Y represents —OR$_5$ and R$_5$ is other than hydrogen, one first reacts about an equimolar amount of an appropriate alcohol or phenol with the desired alkenylsuccinic acid-producing compound according to standard esterification techniques and then reacts the resultant half-ester with about an equimolar quantitiy of a Formula II compound.

The compounds of this invention are useful as dispersants in lubricating oil and fuel systems. They may be used in the range of about 0.0005 to 15% by weight of the oil or fuel composition and may be incorporated therein according to standard techniques. In fuels, the range is 0.0005 to 5%, preferably 0.005 to 2%, by weight of the fuel composition. In lubricants, the range is 0.1 to 15%, preferably 0.1 to 10%, by weight of the lubricant composition. The compounds of the present invention, as evaluated according to several known tests, exhibit outstanding activity as dispersants.

The following describes some of the tests employed in evaluating the compounds of the present invention:

API Service MS Sequence V–A Test.—This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race St., Philadelphia, Pa., 19103.

The engine may be rated at any time during the course of the test. The 7 parts rated for sludge (CRC Merit, 10=clean) are the rocker arm assembly, rocker arm cover plate, valve deck, timing gear cover, push rod cover plate, push rod chamber annd oil pan.

Panel Coker Test.—This test is described in the record of the Fifth World Petroleum Congress (1959) in an article by R. N. Jolie, "Laboratory Screening Test for Lubricating Oil Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

Sundstrand Pump Test.—In this test for distillate fuel oils, 1 liter of fuel oil containing 4 grams of synthetic sludge is treated with the additive. The oil is circulated for an hour through a Sundstrand oil burner pump containing a 100-mesh strainer. The sludge deposit is collected and weighed (Nelson, Osterhaut and Schwindeman, Ind. Eng. Chem., 48, 1892 (1956)).

As will be clearly understood in the art, the fuels contemplated are distillate fuels that boil from 75° to 750° F. which includes gasolines, along with jet and diesel fuels and furnace oils. The present compounds are particularly useful in fuels that boil up to about 600° F., that is, the normal gasolines and jet fuels and similar liquid hydrocarbon fuels.

Lubricating compositions of this invention may be based on mineral oils or on synthetic lubricants. The mineral oils may vary over a wide range of viscosity, such as 1 to 25 cs. at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or diisodecyl adipates, azelates or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositionns of this invention, there may be used one or more other additives, such as anti-oxidants, anti-foam agents, anti-rust agents, anti-wear agents, heavy duty detergents, pour-point depressants, viscosity index improvers, or other type of additive. For example, there may be employed one or more of the dithiophosphates, such as zinc, barium or nickel dialkyldithiophosphate, sulfurized oils, such as sulfurized sperm oil and sulfurized terpenes, phenols, sulfides, alkylaryl sulfonates, petroleum sulfonates, whether nnormal or with alkaline reserve, such as calcium, barium or magnesium petroleum sulfonates, polymers and copolymers from alkyl acrylates, methacrylate, itaconates, or fumarates or vinyl carboxylates and mixtures thereof, copolymers of acrylic esters and polar monoethylenically unsaturated compounds, such as N-vinyl-2-pyrrolidinone, vinylpyridines, aminoalkyl acrylates or methacrylates or polyethylene-glycol acrylic esters, polybutenes, alkylphenolalkylene oxide condensates, alkenylsuccinic anhydrides, various silicones and alkyl or aryl phosphates, such as tricresyl phosphates.

There may also be used 4,4'-methylenebis-2,6-di-tert-butylphenol, trialkylphenol, tris-dimethylaminomethyl) phenol, phenothiazine, naphthylamines, N'-sec-butyl-N,N-dimethyl-p-phenylenediamine, alkaline earth alkylphenates, alkaline earth salicylates, calcium phenylstearate, alkylamines, especially $C_{12}$-$C_{24}$ alkylamines, cyclic amines, alkyl and aryl imidazolines and alkenylsuccinic anhydrides reacted with amines and then with boron compounds, such as boron oxide, boron halides and boron esters.

A turbo prop lubricant may be prepared by blending the compounnds of this invention with di-2-ethylhexyl sebacate and a mixture of polyesters formed by condensing 2-ethyl-1,3-hexane-diol and sebacic acid into the polyesters with 2-ethylhexanol, there being an average of about 3 glycol units per molecule. This composition may also contain anti-oxidant, stabilizer or other useful additives.

The compounds, compositions and method of the present invention may be more fully understood from the following examples which are offered by way of illustration and not by way of limitation. Parts by weight are used throughout.

EXAMPLE 1

A reactor fitted with a water separator was charged with the following materials:
716.9 parts polybutenylsuccinic anhydride (0.502 millimoles anhydride per gram, prepared from maleic anhydride and polybutene having a molecular weight of about 1300),
187.4 parts diethyl N-hydroxyethyliminodipropionate,
648.0 parts toluene and
80.0 parts benzene.

This charge was heated and stirred at 110° to 115° C. for 31 hours with the collection of water as a result of diester formation. The batch was then filtered and the material was stripped for 1½ hours at 110° to 115° C. and 2.5 mm. Hg. The succinate diester obtained as a result of this procedure had the following formula:

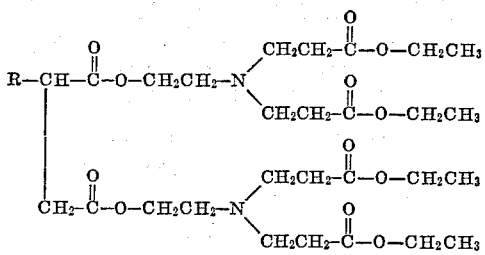

In the above formula, R represents an alkenyl radical derived from the polybutenylsuccinic anhydride starting material.

In the Panel Coker Test, a blend containing 1.0% of the above diester product gives a deposit weight of 32 mg. The same oil without the additive gives a deposit weight of 322 mg.

In the Sundstrand Pump Test at 0.01 gram in 100 ml. of oil, the weight of sludge is 16 mg., while the oil without any additive gives 230 mg.

1.5 parts of the above product is blended with 1.4 part of a commercial zinc dialkyl dithiophosphate into 97.5 parts of a 170 SUS Mid-Continent Solvent Extracted Neutral Oil. The viscosity of this blend is 5.89 cst. at 210° F. and 38.9 cst. at 100° F. with a viscosity index of 103. This blend is evaluated in the Sequence V-A test giving a sludge rating at the end of 75 hours of engine operation of 68.3 (70.0=clean). The value for the reference oil alone is 39.7.

Five parts of the above diester product is blended with 0.7 part of 4,4'-methylenebis(2,6-di-t-butylphenol), 1.0 part of tricresyl phosphate, 0.3 part of sulfurized sperm oil, 8.0 parts of a commercial polymethacrylate viscosity index improver in 85.0 parts of a 150 SUS Solvent Extracted Neutral Oil. The viscosity of this blend is 14.68 cst. at 210° F. and 88.03 cst. at 100° F. with a viscosity index of 143. Its ASTM pour point is —40° F.

EXAMPLE 2

A polybutenylsuccinic anhydride was prepared from maleic anhydride and a polybutene of molecular weight of approximately 1200 and had an anhydride equivalent of 0.506 mole (gram).

A mixture of 328.5 grams of this polybutenylsuccinic anhydride and 43.5 grams of diethyl N-hydroxyethyliminodipropionate was heated with stirring in a reaction flask for 6 hours at 80° to 90° C. whereupon the reaction was completed. The product of the above procedure was the succinate monoester having the formula:

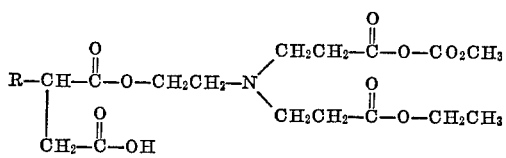

In the above formula, R represents the alkenyl radical derived from the polybutenylsuccinic anhydride starting material.

In the Panel Coker Test, a blend containing 1.0% of the above product gives a deposit weight of 40 mg. The same oil without the additive gives a deposit weight of 322 mg.

In the Sundstrand Pump Test at 0.01 gram in 100 ml. of oil, the weight of sludge is 17 mg., while the oil without any additive gives 200 mg.

1.6 parts of the above product is blended with 1.0 part of a commercial zinc dialkyl dithiophosphate into 97.4 parts of a 170 SUS Mid-Continent Solvent Extracted Neutral Oil. The viscosity of this blend is 5.82 cst. at 210° F. and 38.90 cst. at 100° F. with a viscosity index of 100. This blend is evaluated in the Sequence V-A test giving a sludge rating at the end of 75 hours of engine operation of 68.2 (70.0=clean). The value for the reference oil alone is 39.7.

EXAMPLE 3

A mixture of 391 parts of polybutenylsuccinic anhydride (containing 0.49 millimole of anhydride per gram and made from maleic anhydride and polybutene of molecular weight 1300), 93.8 parts of N-hydroxyethyl-iminodi(N-methylpropionamide), and 40 parts of toluene was heated with stirring at 120-130° C. for eight hours in an apparatus equipped with a water separator. At the end of this time the reaction was complete as evidenced by the theoretical amount of water being evolved. The product was isolated by stripping of the volatile components and filtering. Acidity=0.02 millimole per gram.

The infrared spectrum was consistent with the following succinate diester product:

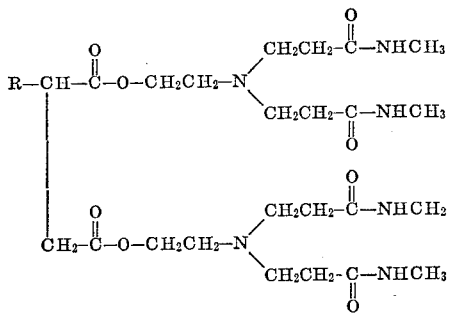

In the above formula, R represents an alkenyl radical derived from the polybutenylsuccinic anhydride starting material.

In the Panel Coker Test, a blend containing 1.0% of the above diester product gives a deposit weight of 50 mg. The same oil without the additive gives a deposit weight of 322 mg.

In the Sundstrand Pump Test at 0.01 gram in 100 ml. of oil, the weight of sludge is 5 mg., while the oil without any additive gives 230 mg.

1.6 parts of the above diester product is blended with 1.0 part of a commercial zinc dialkyl dithiophosphate, 6.0 parts of a commercial polymethacrylate VI improver and 2.0 parts of a basic calcium sulfonate (TBN=300) into 89.4 parts of a 170 SUS Mid-Continent Solvent Extracted Neutral Oil. The viscosity of this blend is 11.32 cst. at 210° F. and 68.18 cst. at 100° F. with a viscosity index of 141. The ASTM pour point is −35° F.

EXAMPLE 4

An equimolar mixture of the two reactants described in Example 3 (398 parts of the polybutenylsuccinic anhydride and 47.8 parts of the N-hydroxymethyliminodi (N-methylpropionamide) was heated with stirring at 90° C. for three hours. The anhydride bands in the infrared completely disappeared at the end of this time. The acid-ester product was stripped of its volatile components at 90° C. and filtered. Percent N=2.06 (theory=2.13).

The reaction product corresponded to the following formula:

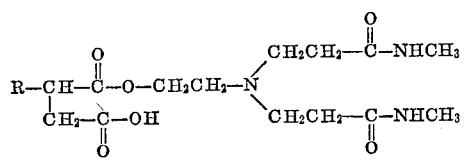

In the Panel Coker Test, a blend containing 1.0% of the above acid-ester product gives a deposit weight of 88 mg. The same oil without the additive gives a deposit weight of 322 mg.

In the Sundstrand Pump Test at 0.01 gram in 100 ml. of oil, the weight of sludge is 1 mg., while the oil without any additive gives 230 mg.

1.4 parts of the above acid-ester product is blended with 1.0 part of a commercial zinc dialkyl dithiophosphate, 60 parts of a commercial polymethacrylate VI improver and 2.0 parts of a basic calcium sulfonate (TB=300) into 89.6 parts of a 170 SUS Mid-Continent Solvent Extracted Neutral Oil. The viscosity of this blend is 11.24 cst. at 210° F. and 61.42 cst. at 100° F. with a viscosity index of 140. The ASTM pour point is −30° F. This blend is evaluated in the Sequence V-A test giving a sludge rating at the end of 75 hours of engine operation of 69.1 (70.0=clean). The value for the reference oil alone is 39.7.

EXAMPLE 5

A mixture of 358 parts of polybutenylsuccinic anhydride with an anhydride content of 0.516 millimole per gram (prepared from maleic anhydride and polybutene of molecular weight 1300), 116.2 parts of N-hydroxyethyliminodi(N-butylpropionamide), and 75 parts of toluene was refluxed with stirring at 130–135° C. for five hours in an apparatus equipped with water seperator. This produced the theoretical amount of water. The slightly hazy reaction mixture was freed of volatile components by vacuum stripping at 130° C. and then filtered. Infrared analysis showed complete conversion to the desired diester.

In the Panel Coker Test, a blend containing 1.0% of the above diester product gives a deposit weight of 34 mg. The same oil without the additive gives a deposit weight of 322 mg.

In the Sundstrand Pump Test at 0.01 gram in 100 ml. of oil, the weight of sludge is 8 mg., while the oil without any additive gives 230 mg.

EXAMPLE 6

The half acid-monoester of the reactants of Example 5 was prepared by mixing 1204 parts of the polybutenylsuccinic anhydride with 193.8 parts of the hydroxyethylpropionamide and 200 parts of xylene at 70–80° C. for three hours. This produced a clean reaction mixture which contained no anhydride absorption in the infrared. The product was isolated by vacuum stripping the solvents at 80° C. and filtering.

In the Panel Coker Test, a blend containing 1.0% of the above monoester product gives a deposit weight of 40 mg. The same oil without the additive gives a deposit weight of 322 mg.

EXAMPLE 7

A mixture of 139 parts of polybutenylsuccinic anhydride with an anhydride content of 0.72 millimole per gram (prepared from maleic anhydride and polybutene of molecular weight 950), 88.3 parts of N-3-hydroxypropyliminodi(N-n-octylpropionamide) and 25 parts of toluene was reacted according to the procedure in Example 1. After complete conversion to the diester as indicated by the theoretical water evolution and infrared analysis, the product was freed of the solvent by vacuum stripping and filtered.

In the Panel Coker Test, a blend containing 1.0% of the above diester product gives a deposit weight of 15 mg. The same oil without the additive gives a deposit weight of 322 mg.

In the Sundstrand Pump Test at 0.01 gram in 100 ml. of oil, the weight of sludge is 12 mg., while the oil without any additive gives 230 mg.

EXAMPLE 8

Preparation of the half acid-monoester of the reactants of Example 7 was effected by mixing 139 parts of the polybutenylsuccinic anhydride with 44.15 parts of the hydroxypropyliminodipropionamide and 25 parts of toluene at 80–90° C. until a clear solution was obtained (about 2 hours). At this point infrared analysis showed complete disappearance of anhydride. Stripping of the solvent at 90° C. and filtering gave the final product.

In the Panel Coker Test, a blend containing 1.0% of the above monoester product gives a deposit weight of 21 mg. The same oil without the additive gives a deposit weight of 322 mg.

In the Sundstrand Pump Test at 0.01 gram in 100 ml. of oil, the weight of sludge is 20 mg., while the oil without any additive gives 230 mg.

EXAMPLE 9

A mixture of 362 parts of polybutenylsuccinic anhydride with an anhydride content of 0.276 millimole per gram (prepared from maleic anhydride and polybutene of molecular weight 2200), 101.1 parts of di-n-decyl N-hydroxyethoxyethylimidodipropionate and 150 parts of toluene was reacted according to the procedure in Example 1. After 14 hours reaction the theoretical amount of water was generated in the toluene —$H_2O$ azeotrope. The diester product was stripped at the reaction temperature and filtered. It had an acidity of 0.02 millimole per gram.

In the Panel Coker Test, a blend containing 1.0% of the above diester product gives a deposit weight of 40 mg. The same oil without the additive gives a deposit weight of 322 mg.

In the Sundstrand Pump Test at 0.01 gram in 100 ml. of oil, the weight of sludge is 22 mg., while the oil without any additive gives 230 mg.

EXAMPLE 10

An equimolar mixture of 172 parts of polypropenylsuccinic anhydride with an anhydride content of 0.581 millimole per gram (made from maleic anhydride and polypropylene of molecular weight 800) and 9.3 parts of aniline was heated with stirring at 90° C. with 50 parts of toluene to effect conversion to the intermediate amic-acid. This was shown by disappearance of the anhydride bands. To this product was then added 59.6 parts of di-t-octylphenyl N-2-hydroxypropyliminodipropionate and the mixture refluxed at 130° C. for 16 hours, using a water separator to remove the water in the toluene —$H_2O$ azeotrope. After the water evolution had ceased, the succinamate product was obtained by vacuum stripping at 130° and filtering. It had an acidity of 0.05 millimole per gram.

In the Panel Coker Test, a blend containing 1.0% of the above succinamate product gives a deposit weight of 53 mg. The same oil without the additive gives a deposit weight of 322 mg.

In the Sundstrand Pump Test at 0.01 gram in 100 ml. of oil, the weight of sludge is 32 mg., while the oil without any additive gives 230 mg.

EXAMPLE 11

A mixture of 172 parts of the polypropenylsuccinic anhydride used in Example 10, 54.2 parts of N-hydroxyethyliminodi(N,N-dimethylpropionamide), and 100 parts of toluene was refluxed at 120–130° C. for twelve hours in an apparatus equipped with a water separator. After obtaining the theoretical amount of water, the product was isolated in the usual way and analysed by infrared and acidity which indicated essentially complete diester formation.

In the Panel Coker Test, a blend containing 1.0% of the above diester product gives a deposit weight of 60 mg. The same oil without the additive gives a deposit weight of 322 mg.

In the Sundstrand Pump Test at 0.01 gram in 100 ml. of oil, the weight of sludge is 30 mg., while the oil without any additive gives 230 mg.

EXAMPLE 12

The half-acid ester of a polyoctenylsuccinic anhydride and n-butanol was prepared by mixing 252 parts of polyoctenylsuccinic anhydride (anhydride content=0.397 millimole per gram, made from maleic anhydride and polyoctene of molecular weight 1800), 7.4 parts of n-butanol and 50 parts of toluene for two hours at 70–90° C. Infrared analysis showed complete reaction. To this was then added 50.6 parts of di-n-decyl N-hydroxyethoxyethyliminodipropionate and the mixture refluxed for 24 hours at 120–130° using a water separator. The final diester product, after removal of the theoretical $H_2O$ and solvent, had an acidity of 0.06 millimole per gram and corresponded to the following formula:

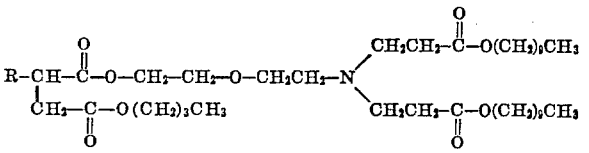

In the Panel Coker Test, a blend containing 1.0% of the above diester product gives a deposit weight of 62 mg. The same oil without the additive gives a deposit weight of 322 mg.

In the Sundstrand Pump Test at 0.01 gram in 100 ml. of oil, the weight of sludge is 60 mg., while the oil without any additive gives 230 mg.

EXAMPLE 13

The diester from polyoctenylsuccinic anhydride and N - 3 - hydroxypropyliminodi(N,N-dibutylpropionamide) was prepared by allowing 252 parts of the polyoctenylsuccinic anhydride of Example 12 to react with 40.3 parts of the hydroxyethyl amide according to the conditions of Example 1. The final product had an infrared spectrum consistent with the desired structure and an acidity of 0.04 millimole per gram.

In the Panel Coker Test, a blend containing 1.0% of the above diester product gives a deposit weight of 38 mg. The same oil without the additive gives a deposit weight of 322 mg.

In the Sundstrand Pump Test at 0.01 gram in 100 ml. of oil, the weight of sludge is 42 mg., while the oil without any additive gives 230 mg.

EXAMPLE 14

A polypropenylsuccinic anhydride is obtained by allowing chlorinated polypropene of number average molecular weight of about 900 and a chlorine content of 3.9% to react with maleic anhydride at 220° C. The polypropenylsuccinic anhydride analyzes 0.91 millimole of anhydride per gram of material.

An equimolar mixture of the above polypropenylsuccinic anhydride and N-$\beta$-hydroxyethyliminodipropionitrile was heated with stirring at 90° C. for three hours to yield the succinate half-ester.

In the Panel Coker Test, a blend containing 1.0% of the above half-ester produce gives a deposit weight of 52 mg. The same oil without the additive gives a deposit weight of 322 mg.

While certain preferred embodiments of the invention have been described, it is understood that the invention is not limited thereto as many variations and modifications will be readily apparent to those skilled in the art.

We claim:

1. As a new composition of matter, a compound of the formula

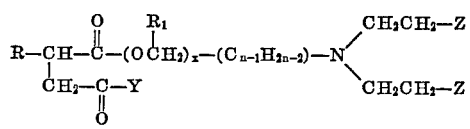

wherein:

R represents an alkenyl radical containing about 12 to 225 carbon atoms, $R_1$ represents hydrogen or methyl, $x$ represents an integer from 1 to 10, $n$ represents an integer from 1 to 9, Z represents

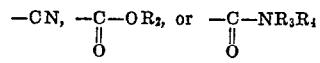

$R_2$ represents an alkyl radical of 1 to 18 carbon atoms, phenyl, benzyl, or an alkylphenyl in which the alkyl moiety contains from 1 to 10 carbon atoms.

$R_3$, $R_4$ and $R_5$ independently represent hydrogen, an alkyl radical of 1 to 18 carbon atoms, phenyl, benzyl, or an alkylphenyl in which the alkyl moiety contains from 1 to 10 carbon atoms, and Y represents —$OR_5$, —$NR_3R_4$, and the formula

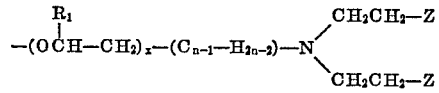

2. A compound according to claim 1 wherein R is a polybutenyl radical.

3. A compound according to claim 1 wherein Y is

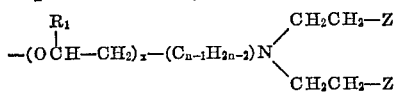

4. A compound according to claim 3 wherein R is a polybutenyl radical, $R_1$ is hydrogen, $R_2$ is ethyl, $x$ is 1, $n$ is 1, and Z is

5. A compound according to claim 3 wherein R is a polybutenyl radical, $R_1$ and $R_3$ are hydrogen, $R_4$ is methyl, $x$ is 1, $n$ is 1 and Z is

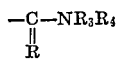

6. A compound according to claim 3 wherein R is a polybutenyl radical, $R_1$ is hydrogen, $x$ is 1, $n$ is 1, and Z is —CN.

7. A composition comprising a major proportion of a lubricating oil and a minor proportion, sufficient to reduce sludge deposition, of a compound described in claim 1.

8. A composition comprising a major proportion of a lubricating oil and a minor proportion, sufficient to reduce sludge deposition, of a compound described in claim 3.

9. A composition comprising a major proportion of a liquid fuel and a minor proportion, sufficient to reduce sludge deposition of a compound described in claim 1.

References Cited

UNITED STATES PATENTS

| | | |
|---|---|---|
| 3,311,558 | 3/1967 | Prizer et al. |
| 3,331,776 | 7/1967 | Krukziener. |
| 3,381,022 | 4/1968 | Le Suer _____ 260—404.8 |

PATRICK P. GARVIN, *Primary Examiner.*

U.S. Cl. X.R.

44—71; 260—465, 465.4, 482, 484, 485, 465.6, 561,562